Patented Oct. 26, 1937

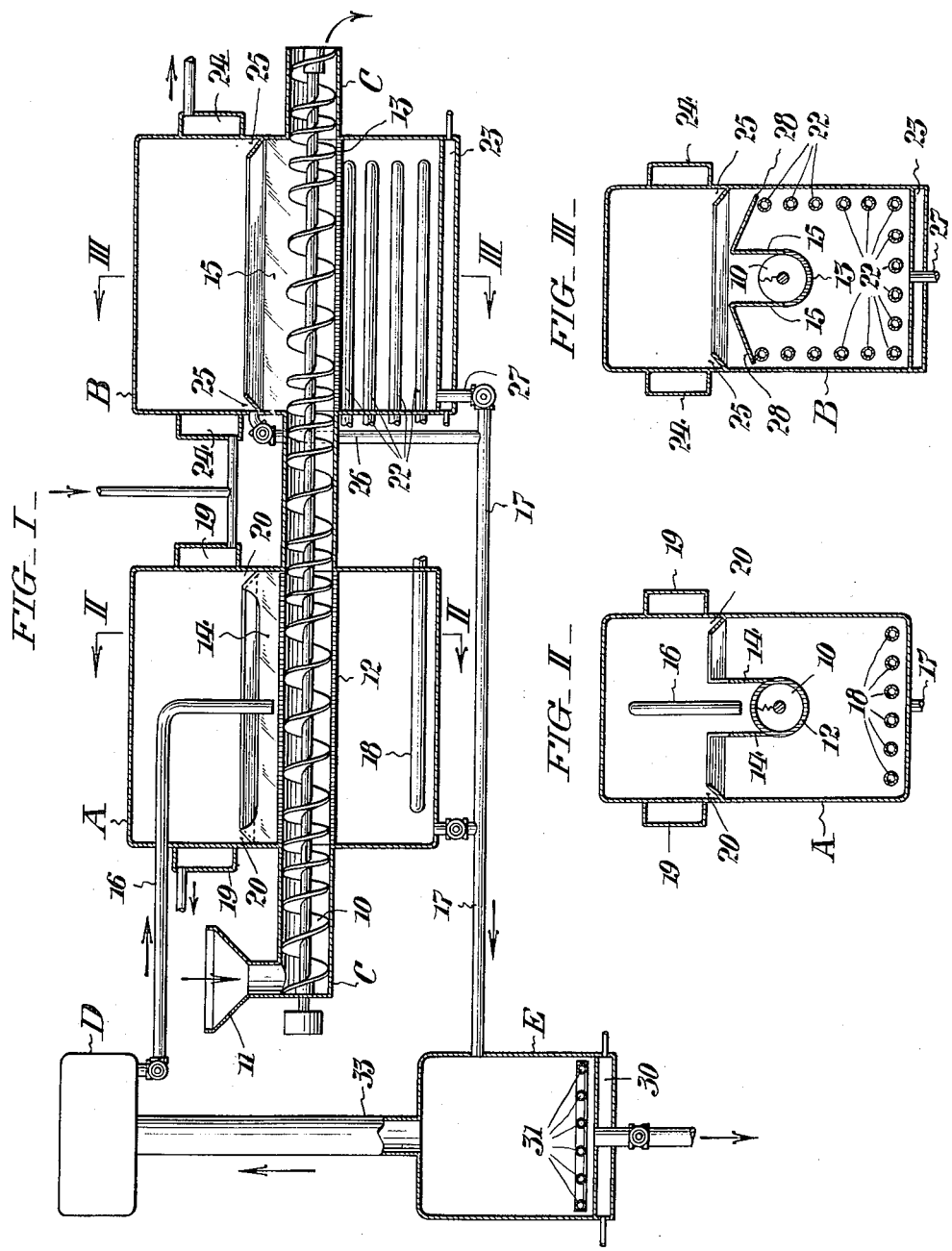

2,097,147

UNITED STATES PATENT OFFICE 2,097,147

EXTRACTION WITH SOLVENTS

Clarence F. Dinley, Detroit, Mich., assignor to James H. Bell, Philadelphia, Pa.

Application January 5, 1937, Serial No. 119,076

6 Claims. (Cl. 87—6)

My invention relates to the use and stabilization of volatile chlorinated solvents, and is especially concerned with the extraction and recovery of the native oil, fat, or the like from organic material by means of chlorinated solvents. Such solvents are exemplified by trichloromethane, tetrachloromethane, trichlorethane, tetrachlorethane, trichlorethylene, and tetrachlorethylene amongst the chlorinated aliphatics, and amongst the chlorinated aromatics by chlorobenzene, and even para, meta, and orthodichlorobenzene,—although these latter are close to the upper limit of volatility. The organic matter treated may be either vegetable or animal and, therefore, either fibrous or cellular, or both. My invention is very useful, for example, in the extraction of oil from soya beans, or other beans or seeds, or in the extraction of oils or fats from carcasses or parts of hogs or other animals, and also in the treatment of garbage for the recovery of various oils, fats, or other greases which it may contain. It may also be found useful for extracting various essential oils and resins from the material containing them, such as wintergreen, peppermint, etc. Other features and advantages of my invention will appear from my description hereinafter of species and embodiments thereof, and from my drawing. All the features herein shown or described are, indeed, of my invention, so far as novel over the prior art.

An object of my invention is to prevent corrosion or other such action on metallic parts or apparatus that may be exposed to the solvent in such extraction processes. I also aim to prevent the evolution of dangerous fumes, which may injuriously affect workers, and may render the vicinity of the apparatus uninhabitable. Such corrosion and fumes may result from decomposition of the solvent when heated under the conditions obtaining in the treatment of vegetable and animal matter of various kinds for the extraction of oils, fats, or greases,—either from contact of the solvent with air or moisture present in the matter treated, or in the apparatus, or from other causes. Moreover, decomposition products from the solvent may in some cases affect objectionably the oils, fats, or greases which it is desired to recover, or may react in undesirable ways with the residue of the organic matter treated,—all of which I aim to prevent.

As indicated by what has been said, the drawbacks of chlorinated solvents for use in the extraction treatment of organic materials are not due to any action of the solvents themselves, but to chlorine (present as impurity in the solvent) in available reactive form(s), such as hydrochloric acid or other chlorine acids, or free chlorine, even. Commercial chlorinated solvents commonly contain such available chlorine, and may have an acidity that is capable of titration by ordinary laboratory methods.

To some extent and in some cases, the objectionable effects of decomposition of the solvent may be prevented by the presence therewith of solid alkalis, preferably water-insoluble or nearly so (such as limestone, marble, or other forms of calcium carbonate), or, better still, by the use of solid stabilizers which do not vaporize. But while such substances perform their function very well in the liquid solvent, their influence is not very effective in the vapor of the solvent, and it is especially in the vapor phase that the solvent decomposes, and that acid and/or (free) available chlorine are formed. Best results are obtained, therefore, by carrying out the treatment in the presence of a reagent that is of such volatility as to vaporize with the solvent, and that will stabilize the solvent vapor or counteract the objectionable decomposition,—partly, perhaps, by being itself readily chlorinated, or by neutralizing deleterious decomposition products in the vapor, but mainly or in large measure by preventing the usual decomposition of the solvent (i. e., stabilization in a stricter sense). Whatever its action, the stabilizing agent employed should, of course, be compatible with the undecomposed solvent, so as neither to react with it under the conditions of use, nor to be driven off or separated from the solvent. That it should not boil so much below the solvent as to be driven off by the heat is also implied in its compatibility with the solvent, as well as in the statement that it vaporizes with the solvent. This last statement also implies, of course, that the stabilizer volatilizes without being itself decomposed by the heat. A great many organic substances such as hereinafter indicated are known to chemists as having suitable properties.

It will be understood that however such properties as alkalinity and chlorinatability may be related to stabilizing power, and however desirable the elimination of acid decomposition products may be in itself, yet stabilization as such consists not in any mere continual elimination of decomposition products (as by reaction with an ever-present supply of calcium carbonate or the like alkali), but in a prevention or retardation of the decomposition process. A given amount of efficient stabilizing material, indeed, is effective for a length of time far beyond the mere quantitative capacity of this material for eliminating products of decomposition, if they were formed as rapidly as though no stabilizer were present.

Besides the correlation of the stabilizer with the solvent as above indicated, the stabilizer (as well as the solvent itself) must, of course, also be correlated and compatible with the organic material treated. In other words, the stabilizer must not react either with the oil, fat, or the like to be recovered, or with the rest of the organic matter to be treated; nor must it be of such character that its presence would be seriously objectionable in the product(s) to be recovered, or in the residue(s) from the extraction operation. If it tends to remain with either of these products in more than negligible amount, it should be of such character that it can be eliminated from them, without excessive cost, by suitable steps or operations. Of course, the great variety of organic substances which it may be desired to treat with chlorinated solvents for purposes of extraction preclude broad generalizations as to the suitability of stabilizers from this angle.

Examples of a type of stabilizers that appear to be effective in part by neutralizing the (chlorine) acid, as well as by undergoing chlorination, are the alkaloids,—such as berberine, caffeine, quinine, cinchonine, cocaine,—either in pure or crude forms. Alkaloids are soluble in chlorinated solvents and impart to the solvent an alkaline reaction when used in sufficient proportions, such as hereinafter indicated. While alkaloids are not volatile like other types of stabilizers hereinbefore and hereinafter referred to, and do not vaporize freely with the solvent as mentioned above, yet they tend to minimize the presence of available chlorine (acid) in the solvent vapor, besides eliminating it from the liquid solvent. Stabilizing influence of non-vaporizing stabilizers (such as alkaloids) in the solvent vapor may to a degree be due to a peculiar sort of volatilization of such stabilizers when dissolved in the boiling solvent. However, the amount of non-vaporizing stabilizer thus disseminated and carried in the solvent vapor is at best very minute as compared with the substantial proportion vaporizing or distilling with the solvent when the latter and the stabilizer boil at temperatures sufficiently close together.

Alkaloids being in many cases relatively inert, their presence in extraction products or residues may in many cases be unobjectionable,—except, of course, when the product or residue is to be used for food, when the bitterness or other strong taste of many alkaloids might be offensive.

Another class of stabilizers that neutralize acid, and also undergo chlorination, are the volatile organic bases, and particularly volatile amines and basic cyclic organic compounds characterized by nitrogen in the ring,—as well as a few volatile organic bases which appear to owe their alkalinity to the presence of phosphorus in the molecule. These are soluble in chlorinated solvents and impart to the solvent an alkaline reaction, when used in such proportions as hereinafter indicated. Amongst the amines, I may particularly instance diethylamine, benzylamine, triethylamine,—although there are a very large number of amines that are volatile in the boiling range of chlorinated solvents, up to 150° C. or even 180° C. In general, I prefer the tertiary amines, characterized by the nitrogen radical. Amongst the cyclic organic compounds, I may instance the pyridines, such as pyridine itself, methyl pyridines or picolines, and ethyl pyridines; pyrazine, pyrimidine, and piperidine; and pyrollic or pyrolle type bases such as pyrroline, pyrazoline, and pyrrolidine. In some cases, of course, the persistent odor of pyridine or the like might be objectionable.

Another class of stabilizers consists of the essential oils, which are volatile, are soluble in chlorinated solvents, including trichlorethylene, distil or sublime with water, and besides being chlorinatable appear to prevent or inhibit the usual decomposition of the solvent vapor,—or at least obviate corrosion of metal, etc., as a result of such decomposition. Of these I may instance camphor, turpentine, pine oil, oil of wintergreen, oil of lemongrass, oil of citronella.

The essential oils are not so readily volatile as many of the organic bases, although the water commonly present with chlorinated solvents assists somewhat in their volatilization. In general, these substances have decided but inoffensive odors, so that they may in some cases advantageously be used along with odorous organic bases (such as pyridine, for example) to disguise objectionable odors of the organic bases. They have the special advantage that they can be readily and thoroughly steam-distilled out of the extract resulting from treatment of organic matter with them, for the purpose of finally recovering the extracted oil, grease, or the like and purifying the solvent for re-use. Moreover, any last residue of essential oil remaining in the extracted product after recovery in this manner does not render the product odorous, as would organic bases.

In cases where essential oils are themselves to be extracted by means of chlorinated solvents, the essential oil so extracted itself serves as a stabilizer; so that the solvent only requires a small amount of stabilizer added before use, to prevent decomposition before it has taken up any essential oil from the material treated.

In admixture with solvents with which they are compatible and suitably correlated as regards volatility, as already stated, volatile agents are effective in the vapor phase, when moisture comes in contact with the solvent vapor. The effect of alkaloids which are not freely volatile also seems to be felt in the vapor phase of the solvent, as already mentioned. Insofar as the stabilizing agents (whether volatile or not) are chlorinated by chlorine (acid) liberated by incipient decomposition of the solvent, or neutralize such acid, this removal of a product of decomposition seems one probably rationale of the stabilizing effect. This applies equally to chlorination of the stabilizer in the strict sense, involving insertion or substitution of chlorine in the stabilizer molecule, or its addition thereto, and to chlorination involving addition to hydrochloric acid (HCL) to the stabilizer molecule to form a hydrochloride.

Irrespective of chlorination, however, it would seem that many of my stabilizers have a more strictly inhibitory power as against the usual decomposition of the solvent vapor and/or the reaction of the resulting chlorine (acid) with metal: particularly the essential oils, as already mentioned, and even the alkaloids. They do, at any rate, prevent corrosion of metal in contact with the hot solvent or its vapor, even when the latter is exposed to the atmosphere.

In practice, it is, of course, convenient to add the stabilizer to the solvent before use of the latter, and it is therefore preferable that the stabilizer should be soluble in the chlorinated solvent,—as is the case with the stabilizing substances hereinbefore mentioned. The amount of organic stabilizer added to the solvent must, of course, exceed what is required to neutralize any initial acidity of the solvent. In general, an addition of anywhere from about ¼ of 1% to 1½% by weight will be found sufficient,—particularly in the case of alkaloids. However, larger proportions may sometimes be used: e. g., ¼ to 5% of pyridine, which has no effect on steel; although in excess it will slightly tarnish highly polished brass. Such proportions of organic stabilizer generally suffice to maintain an admixture thereof with the heated chlorinated solvent over an extended period of use of the solvent, involving treatment of a series of batches of organic material therewith. The solvent will not cause corrosion or other deleterious action due to acid, nor give off objectionable fumes, as long as any of the stabilizing ingredient remains. The stability of the solvent may be extended indefinitely by repeated timely additions of the organic stabilizing agent. Stabilizers which boil sufficiently close to the boiling point of the solvent with which they are used remain with it when the solvent is distilled,—as may be necessary as an incident of the extraction process for the purpose of recovering the extracted oil, fat, or the like.

The boiling points of volatile aliphatic chlorinated solvents and of certain volatile stabilizers hereinbefore mentioned are as follows:

| | °C. |
|---|---|
| Trichloromethane | 61 |
| Tetrachloromethane | 77 |
| Dichlorethane | 84 |
| Trichlorethylene | 87 |
| Tetrachlorethylene | 121 |
| Tetrachlorethane | 146 |
| Pyridine | 115 |
| Turpentine | 159 |

To distinguish these and other similarly volatile solvents, I have limited certain of my claims to chlorinated aliphatic (or other) hydrocarbon solvents boiling under substantially 150° C.

To express more definite correlation of the stabilizer with the solvent, I have in certain claims referred to the boiling point of the stabilizer as sufficiently near that of the solvent to insure vaporization of the stabilizer concurrently with the solvent in substantial proportion under the influence of heat,—as contrasted with the minute proportions (less than $\frac{1}{10}$ of 1%) in which substances boiling very much higher than the solvent (like aniline) would vaporize with it.

It will be understood that extraction treatment of organic material with chlorinated solvents, under stabilization according to my invention, may be carried out just as with other solvents,—always with the important advantage that the solvent does not decompose appreciably, and that drawbacks due to such decomposition (such as indicated above) are thus avoided. I prefer, however, to employ the process and apparatus here illustrated and described.

In the drawing, Fig. I is a diagrammatic side view of a system of apparatus suitable for the process of extraction according to my invention.

Fig. II shows a cross-section through part of the apparatus, taken as indicated by the line and arrows II—II in Fig. I.

Fig. III shows a similar cross-section through another part of the apparatus, taken as indicated by the line and arrows III—III in Fig. I.

For treatment with the solvent, the organic material should preferably be brought to a suitably fine state of division; and for this any suitable method may be used, according to the character of the material. Soya beans, for example, may be finely flaked; or they may be crushed or ground with any commercial machinery suitable for the purpose, to such fineness that at least 90% will go through a 20-mesh sieve.

The finely divided material passes through a chamber or apparatus A in which it is brought in contact and saturated with clean solvent, and then through a chamber or apparatus B in which the solvent (with the oil, fat, or the like that it has dissolved and taken up) is separated or dried out from the residue of the material. For this purpose, a tubular channel or conduit C extends through the chambers A and B, and means such as an Archimedes screw 10 is provided for feeding the crushed soya beans or other material to be treated from a receiving hopper 11 at one end through the tube C to the discharge at the other end of the tube. The portions of the tube C outside of and between the chambers A, B may be of metal or other impervious material; but the portions 12, 13 in the chambers A, B are of finely foraminous or porous character, permitting passage of liquid or vapors through the tube walls. Along and above the tube portions 12, 13 extend metallic or other impervious side walls 14, 14 and 15, 15, forming in each case a trough with the tube as its bottom (see Figs. II and III).

Pure solvent from any suitable source (represented in Fig. I as a condenser D) supplied through a (valved) pipe 16 fills the trough 14 in chamber A, percolates through the corresponding porous tube section 12 and the material therein, leaching out its oil, fat, or the like, and runs down into the bottom of the chamber, whence it may drain or be drawn away through a (valved) pipe 17 to any suitable grease and solvent separating and recovery plant,—here represented by a distilling vaporizer E. As shown, the chamber A is provided with heating device(s) or units in its bottom, such as tubes 18 for the circulation of hot water (or steam), to maintain in the chamber a temperature preferably approximating but not exceeding the boiling point of the solvent used. Provision is made for cooling and condensing the solvent vapor on the wall of the upper part of the chamber A, as by means of an external jacket 19 through which cooling water may be circulated. The pure condensed solvent running down the cooled inner wall of the chamber A collects in a wall-trough or gutter 20, which returns it to the trough 14 at either end of the chamber.

In the chamber B, the upper half of the tube C is preferably omitted, so that the lower half and the sides 15, 15 form an open round-bottomed trough in which the solvent evaporates or dries out of the crushed soya beans or other material treated. For heating the lower portion of the chamber B, there are heating device(s) or units 22 in its bottom and along its sides, such as tubes for the circulation of steam. In addition, the bottom wall of the chamber B may have a steam jacket 23. In the upper part of the chamber B, the vapor is condensed on the wall by an external cooling jacket 24, and runs down into a wall-trough or gutter 25, as in the chamber B. Instead of being returned from the gutter 25 to the trough 15, however, the condensate is led off through a valved pipe connection 26 into the pipe 17, and thus drained or drawn away to the vaporizer E or the like. Any liquid in the bottom of the chamber B is led off through a valved pipe connection 27 into the same pipe 17. As shown, there are sloping metal baffle plates 28, 28 extending from each upper edge of the trough 15 nearly to the sides of the chamber B, just above the topmost heating devices 22, 22.

The vaporizer E may be provided with any suitable heating means for heating the grease-laden solvent draining into it from the chambers A, B, such as a steam-jacket 30 on its bottom. As shown, provision is also made for injecting live steam into the liquid in the vaporizer E, through perforated piping 31 near its bottom, for the purpose of steam-distilling the liquid. The solvent vapor evolved in the vaporizer E may be led through a pipe connection 33 to the (surface) condenser D already mentioned, which may be of any suitable type. From this condenser D, the purified solvent is led back to the trough 14 in chamber A through the pipe 16, as mentioned above.

Preferably, the feed screw 10 is generally of such pitch as to feed the crushed soya beans or other material through the chambers A and B quite loose, in a layer not more than about half filling the tube C. As the screw 10 revolves, it agitates and kneads the loose material, so that new surfaces are continually opened up and presented to the percolating solvent. At and near the ends of the chambers A, B (and in the part of the tube C interconnecting them), however, the feed screw 10 may be of considerably reduced pitch, so as to pack the material sufficiently to fill the entire cross-section of the tube and prevent or minimize ingress of air or passage of solvent vapor from chamber B to chamber A.

In operation, the temperature in chamber A should preferably be kept about (or not over) the boiling point of the solvent used, to secure maximum dissolution of the oil, fat, or the like by the solvent and avoid boiling the latter. In the chamber B, the temperature should preferably be kept well above the boiling point of the grease-laden solvent, in order to vaporize it and dry out the residue of crushed soya beans or other material treated. Using trichloroethylene as the solvent, this would mean about 188° F. in chamber A and 200-212° F. in chamber B.

If desired, a vacuum may be maintained in the chamber B and in the vaporizer E,—either or both,—as by connections to condenser D, or any other suitable means. Solvent may or may not be boiled in chamber A. In chamber B, the tube C (and trough 15) may if desired be specially heated, as by any suitable heating means externally carried by it, or included in its wall.

A great variety of solvents may be used in the apparatus shown in Figs. I–III, according to the material treated; nor is the choice by any means limited to chlorinated solvents. When chlorinated solvents are used for the extraction treatment of soya beans, essential oils may advantageously be used as stabilizers, and particularly turpentine, oil of citronella, or the like.

Having thus described my invention, I claim:

1. An improved process of extracting native oil or fat from moisture and oil or fat-containing animal or vegetable cellular and/or fibrous material with hot volatile organic chlorinated grease solvents that decompose with generation of chlorine acid when they are exposed in the hot vapor state to the atmosphere or to moisture, and of preventing decomposition of the solvent due to such exposure even when the material treated contains moisture, as well as deterioration of the matter treated resulting from decomposition of the solvent; which process comprises heating and volatilizing, along with the organic chlorinated solvent, an organic stabilizer that is compatible and unreactive with the material treated and is soluble in and compatible with the moist chlorinated solvent, volatilizing with the solvent without being decomposed by heat but not boiling off from it below the boiling point of the chlorinated solvent; and treating the material with the solvent, thus stabilized, while maintaining admixture of volatilized organic stabilizer with the chlorinated solvent vapor during the exposure of the solvent to the atmosphere or to moisture as aforesaid.

2. An improved process of extracting native oil or fat from moisture and oil or fat-containing animal or vegetable cellular and/or fibrous material with hot volatile organic chlorinated grease solvents that decompose with generation of chlorine acid when they are exposed in the hot vapor state to the atmosphere or to moisture, and of preventing decomposition of the solvent due to such exposure even when the material treated contains moisture, as well as deterioration of the matter treated resulting from decomposition of the solvent; which process comprises heating and volatilizing, along with the organic chlorinated solvent, a stabilizing organic base that is chlorinatable and is also compatible and unreactive both with the material treated and with the moist chlorinated solvent, volatilizing with the solvent without being decomposed by heat but not boiling off from it below the boiling point of the chlorinated solvent; and treating the material with the solvent, thus stabilized, while maintaining admixture of volatilized organic stabilizer with the chlorinated solvent vapor during the exposure of the solvent to the atmosphere or to moisture as aforesaid.

3. An improved process in accordance with claim 2, wherein the organic stabilizer is a volatile amine base characterized by the nitrogen radical.

4. An improved process in accordance with claim 2, wherein the organic stabilizer is a basic volatile cyclic organic compound characterized by nitrogen in the ring.

5. An improved process of extracting native oil or fat from moisture and oil or fat-containing animal or vegetable cellular and/or fibrous material with hot volatile organic chlorinated grease solvents that decompose with generation of chlorine acid when they are exposed in the hot vapor state to the atmosphere or to moisture, and of preventing decomposition of the solvent due to such exposure even when the material treated contains moisture, as well as deterioration of the matter treated resulting from decomposition of the solvent; which process comprises heating and volatilizing, along with the organic chlorinated solvent, stabilizing essential oil that is compatible both with the material treated and with the moist chlorinated solvent, volatilizing with the solvent without being decomposed by heat but not boiling off from it below the boiling point of said solvent; and treating the material with the solvent, thus stabilized, while maintaining admixture of volatilized essential oil with the chlorinated solvent vapor during the exposure of the solvent to the atmosphere or to moisture as aforesaid.

6. An improved process of extracting native oil or fat from moisture and oil or fat-containing animal or vegetable cellular and/or fibrous material with hot volatile organic chlorinated grease solvents that decompose with generation of chlorine acid when they are exposed in the hot vapor state to the atmosphere or to moisture, and of preventing decomposition of the solvent due to such exposure even when the material treated contains moisture, as well as deterioration of the matter treated resulting from decomposition of the solvent; which process comprises heating and vaporizing, along with the organic chlorinated solvent, stabilizing essential oil and organic base that are compatible both with the material treated and with the moist chlorinated solvent, vaporizing with the solvent without being decomposed by heat but not boiling off from it below the boiling point of said solvent; and treating the material with the solvent, thus stabilized, while maintaining admixture of vaporized essential oil and organic base with the chlorinated solvent vapor during the exposure of the solvent to the atmosphere or to moisture as aforesaid.

CLARENCE F. DINLEY.